J. C. WIRTZ.
VEGETABLE WASHING MACHINE.
APPLICATION FILED FEB. 2, 1914.
1,115,142.
Patented Oct. 27, 1914.
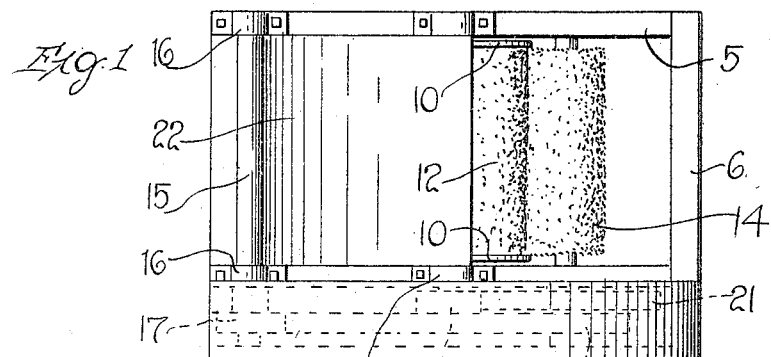
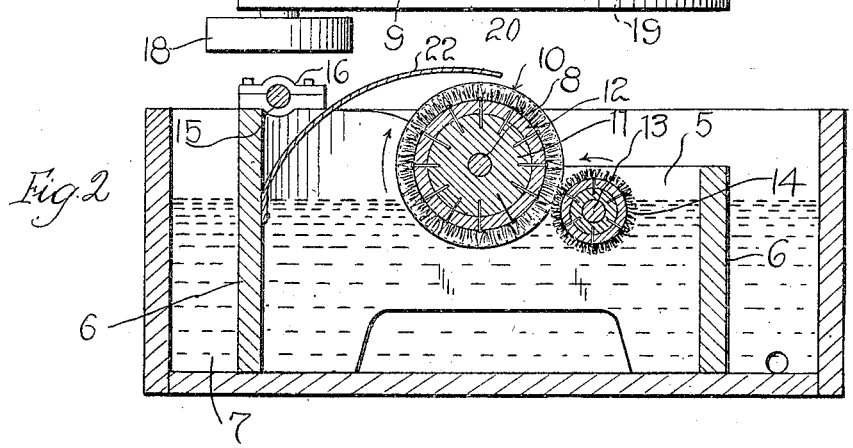
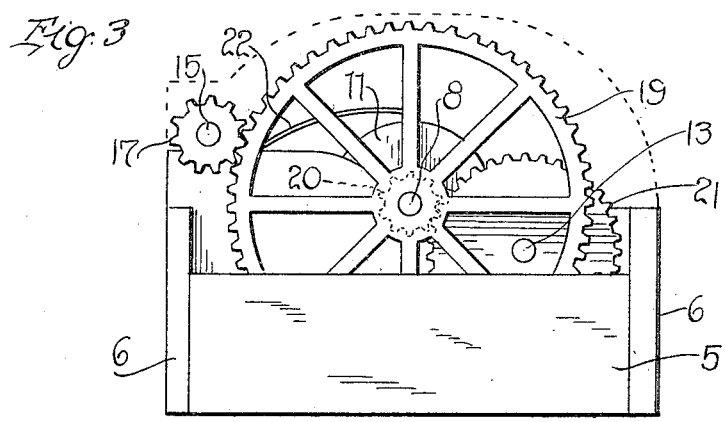
Witnesses
Inventor
J. C. WIRTZ
By Watson E. Coleman
Attorney

UNITED STATES PATENT OFFICE.

JOSEPH C. WIRTZ, OF NEW CASTLE, PENNSYLVANIA.

VEGETABLE-WASHING MACHINE.

1,115,142.  Specification of Letters Patent.  Patented Oct. 27, 1914.

Application filed February 2, 1914. Serial No. 816,065.

*To all whom it may concern:*

Be it known that I, JOSEPH C. WIRTZ, citizen of the United States, residing at New Castle, in the county of Lawrence and State of Pennsylvania, have invented certain new and useful Improvements in Vegetable-Washing Machines, of which the following is a specification, reference being had to the accompanying drawings.

This invention relates to vegetable washing machines and has for its primary object to produce a device of this character whereby a large quantity of vegetables may be easily, quickly and thoroughly washed with a minimum of labor on the part of the operator.

The invention has for a more specific object to provide a machine for the above purpose including a suitable frame adapted to be arranged in a water receiving chamber or trough, oppositely rotating brushes mounted in said frame, the bristles of the brushes exerting a scraping or scouring action upon the vegetables to loosen the accumulations of dirt thereon.

My invention has for a further object to produce a machine for the washing of vegetables after harvesting and while the tops remain thereon, which is highly efficient and reliable in practical use, and may be produced at small manufacturing cost.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a top plan view of a vegetable washing machine showing my invention in its preferred form. Fig. 2 is a longitudinal section thereof. Fig. 3 is a side elevation, the gear housing being removed.

Referring in detail to the drawing, 5 designates the side members of the frame in which the operating parts of the machine are mounted, and 6 indicates the end bars which connect said side members. This frame is adapted to be arranged in a water receiving box or trough indicated at 7, the end or side wall of said trough being provided with water outlet openings.

The shaft 8 is journaled in suitable bearings indicated at 9 arranged upon the upper edges of the side members 5 of the frame and upon this shaft, the spaced brush heads 10 are keyed or otherwise fixed. The brush heads are connected by the cylindrical brush body 11 and upon this brush body a plurality of parallel longitudinal brushes 12 are keyed or otherwise preferably removably mounted. A second shaft 13 is rotatably mounted in the side members 5 of the frame and upon the same a similarly constructed brush 14 is secured. The shaft 13, it will be noted, is arranged below the main brush shaft 8. Above this shaft and upon the opposite side thereof, with relation to the shaft 13, a counter shaft 15 is journaled in the bearings 16 secured upon the upper edges of the frame members 5. Upon one end of this counter shaft 15, the pinion 17 is keyed and a band wheel 18 is also fixed upon said shaft. The pinion 17 meshes with a large gear wheel 19 secured upon one end of the brush shaft 8. A pinion 20 is also secured upon this shaft inwardly of the gear 19 and engages the teeth of a gear wheel 21 which is secured upon one end of the brush shaft 13. In this manner, it will be obvious that when the counter shaft 15 is driven from an engine or other suitable source of power, the brushes 12 and 14 are rotated in relatively opposite directions.

A curved shield plate 22 is suitably secured at one end of the frame and extends upwardly over one side and the top of the brush 12. This plate is provided for the purpose of preventing the water being thrown outwardly by the rotating brush 10 upon the operator as he feeds the vegetables to the machine.

Having above described the construction and arrangement of the several coöperating parts of the machine, its operation will be understood as follows: As the vegetables are gathered or harvested, they are fed to the machine upon the bristles of the brushes 12 and 14. These brushes rotating in opposite directions as indicated by the arrows in Fig. 2, turn or agitate the vegetables and exert a scraping or rubbing action thereon.

As clearly shown in Fig. 2 of the drawing, the rotating brushes extend down into the water which is being constantly supplied to the bristles thereof.

It will be obvious that the combined scraping or scouring action of the bristles upon the surface of the vegetables and the water which loosens the accumulations or earth thereon, will thoroughly remove all particles of soil or other foreign matter. The water of course, is periodically renewed in the trough 7 from which it may be carried off through suitable pipes or conduits connected to the outlet openings thereof.

From the foregoing description taken in connection with the accompanying drawing, it is thought that the construction, manner of operation and several advantages of my invention will be clearly and fully understood.

The device is very simple in its construction, highly efficient, reliable and convenient in practical use and may be produced at small manufacturing cost.

While I have shown and described the preferred construction and arrangement of the several parts, it will be understood that the invention is susceptible of considerable modification therein and I therefore reserve the privilege of resorting to all such legitimate changes as may be fairly embodied within the spirit and scope of the invention as claimed.

Having thus described the invention, what is claimed is:

The combination with a water containing trough, of a vegetable washing machine including a frame adapted to be arranged in said trough, a pair of parallel rotary brushes mounted in said frame, said brushes being of relatively different diameters and the smaller brush disposed wholly below the rotative axis of the other brush and adapted to support and direct the vegetables against the bristles of the latter brush, the lower portion of the larger brush extending below the water level and the major portion of said smaller brush extending below the water level, and means for rotating said brushes in opposite directions to copiously supply the water to the vegetables.

In testimony whereof I hereunto affix my signature in the presence of two witnesses.

JOSEPH C. WIRTZ.

Witnesses:
 JNO. W. EDGAR,
 WILLIAM SMITH.

---

Copies of this patent may be obtained for five cents each, by addressing the "Commissioner of Patents. Washington, D. C."